(12) United States Patent
Yang

(10) Patent No.: US 12,133,002 B2
(45) Date of Patent: Oct. 29, 2024

(54) IMAGE PROCESSING METHOD AND ELECTRONIC DEVICE

(71) Applicant: SAMSUNG ELECTRONICS CO., LTD., Suwon-si (KR)

(72) Inventor: Liwei Yang, Suzhou (CN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 194 days.

(21) Appl. No.: 17/743,129

(22) Filed: May 12, 2022

(65) Prior Publication Data
US 2023/0308774 A1 Sep. 28, 2023

(30) Foreign Application Priority Data
Mar. 25, 2022 (CN) .......................... 202210304383.6

(51) Int. Cl.
| | |
|---|---|
| *H04N 23/84* | (2023.01) |
| *G06T 3/4015* | (2024.01) |
| *G06T 5/50* | (2006.01) |
| *G06T 5/73* | (2024.01) |
| *G06T 7/90* | (2017.01) |
| *G06V 10/56* | (2022.01) |
| *G06V 10/60* | (2022.01) |

(Continued)

(52) U.S. Cl.
CPC ......... *H04N 23/843* (2023.01); *G06T 3/4015* (2013.01); *G06T 5/50* (2013.01); *G06T 5/73* (2024.01); *G06T 7/90* (2017.01); *G06V 10/56* (2022.01); *G06V 10/60* (2022.01); *H04N 9/646* (2013.01); *H04N 23/951* (2023.01); *G06T 2207/10024* (2013.01)

(58) Field of Classification Search
None
See application file for complete search history.

(56) References Cited

U.S. PATENT DOCUMENTS

| | | | |
|---|---|---|---|
| 8,233,733 | B2 | 7/2012 | Yasuma et al. |
| 10,516,860 | B2 | 12/2019 | Wang et al. |

(Continued)

FOREIGN PATENT DOCUMENTS

| | | |
|---|---|---|
| CN | 101282486 A | 10/2008 |
| CN | 105430358 A | 3/2016 |

(Continued)

OTHER PUBLICATIONS

English translation of JP-2008153846-A, Mizoguchi, 2008 (Year: 2008).*

(Continued)

*Primary Examiner* — James M Hannett
(74) *Attorney, Agent, or Firm* — Sughrue Mion, PLLC

(57) ABSTRACT

An image processing method includes receiving a raw image of an image sensor as a first image; performing remosaicing on the first image to generate a second image in a Bayer format, the performing the remosaicing including: converting the first image into a first color image, performing false color correction on the first color image, re-correcting an over-correction caused in performing the false color correction to generate a second color image, and converting the second color image into the second image in the Bayer format; and generating a full resolution image as an output image based on the second image.

12 Claims, 14 Drawing Sheets

(51) Int. Cl.
    *H04N 9/64*       (2023.01)
    *H04N 23/951*    (2023.01)

(56)             References Cited

U.S. PATENT DOCUMENTS

| | | |
|---|---|---|
| 2016/0373653 A1 | 12/2016 | Park et al. |
| 2018/0357750 A1* | 12/2018 | Chen .................... G06T 3/4038 |
| 2020/0221027 A1 | 7/2020 | Lee et al. |
| 2021/0006755 A1* | 1/2021 | Kim ...................... G06T 3/4046 |
| 2021/0211615 A1 | 7/2021 | Kim et al. |
| 2022/0224820 A1* | 7/2022 | Liu ....................... H04N 25/134 |

FOREIGN PATENT DOCUMENTS

| | | | | |
|---|---|---|---|---|
| CN | 107181905 A | | 9/2017 | |
| CN | 111432191 A | | 7/2020 | |
| CN | 112954251 A | | 6/2021 | |
| JP | 2008153846 A | * | 7/2008 | |
| JP | 2011-223221 A | | 11/2011 | |
| KR | 10-2021-0044648 A | | 4/2021 | |
| KR | 10-2021-0047070 A | | 4/2021 | |
| WO | WO-2005041588 A1 | * | 5/2005 | ........... H04N 1/6027 |

OTHER PUBLICATIONS

English translation of WO-2005041588-A1, Atsumi, 2005 (Year: 2005).*
Office Action issued on Jan. 17, 2024 by the Chinese Patent Office in corresponding CN Patent Application No. 202210304383.6.

* cited by examiner

FIG. 2

| | | Raw image |
|---|---|---|
| Tetra sensor | CMOS | <table><tr><td>Gr</td><td>Gr</td><td>R</td><td>R</td></tr><tr><td>Gr</td><td>Gr</td><td>R</td><td>R</td></tr><tr><td>B</td><td>B</td><td>Gb</td><td>Gb</td></tr><tr><td>B</td><td>B</td><td>Gb</td><td>Gb</td></tr></table> |
| Nona sensor | CMOS | <table><tr><td>Gr</td><td>Gr</td><td>Gr</td><td>R</td><td>R</td><td>R</td></tr><tr><td>Gr</td><td>Gr</td><td>Gr</td><td>R</td><td>R</td><td>R</td></tr><tr><td>Gr</td><td>Gr</td><td>Gr</td><td>R</td><td>R</td><td>R</td></tr><tr><td>B</td><td>B</td><td>B</td><td>Gb</td><td>Gb</td><td>Gb</td></tr><tr><td>B</td><td>B</td><td>B</td><td>Gb</td><td>Gb</td><td>Gb</td></tr><tr><td>B</td><td>B</td><td>B</td><td>Gb</td><td>Gb</td><td>Gb</td></tr></table> |
| ⋮ | | ⋮ |

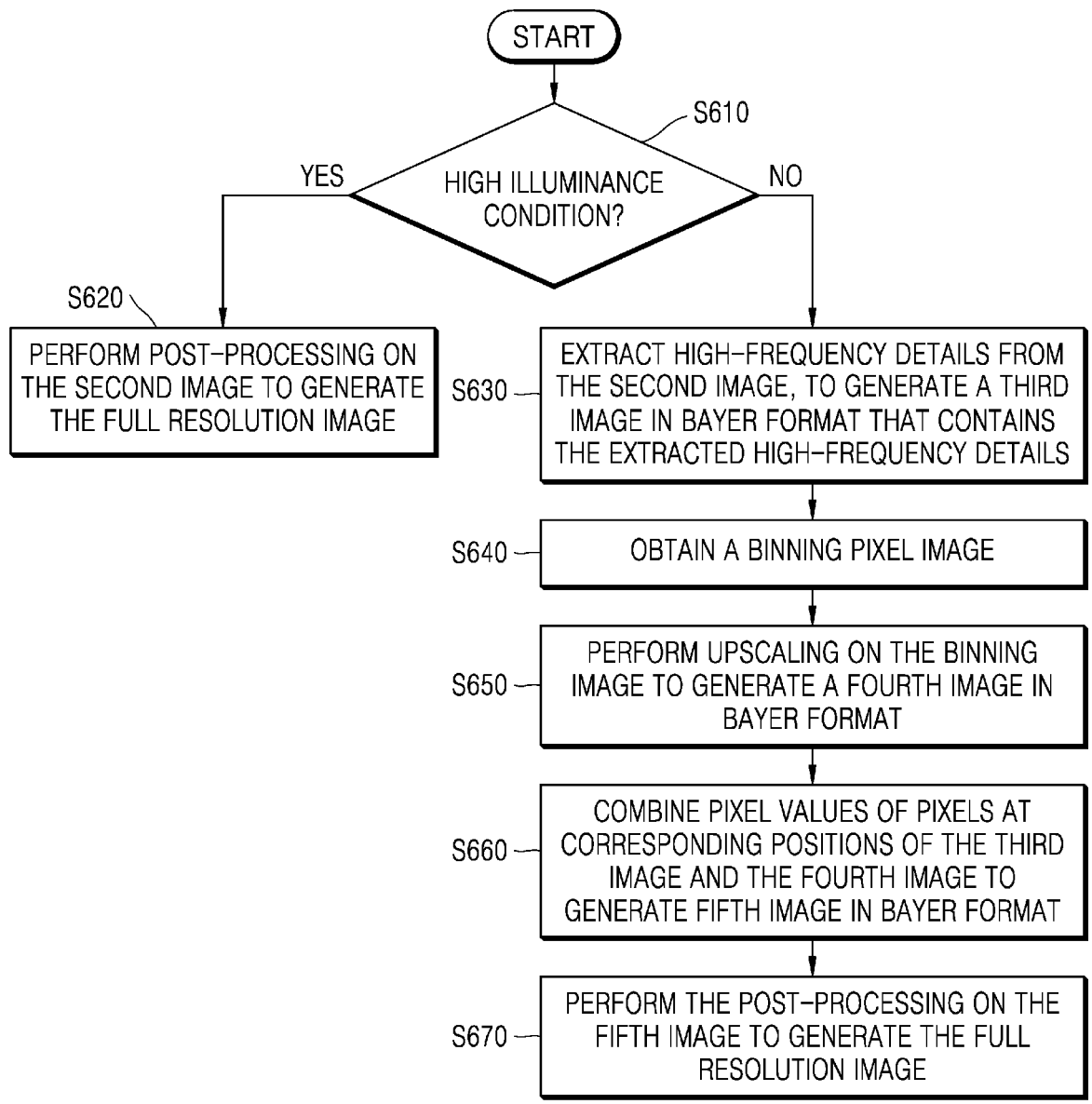

IMAGE PROCESSING METHOD AND ELECTRONIC DEVICE

CROSS-REFERENCE TO RELATED APPLICATION(S)

This application is based on and claims priority under 35 U.S.C. § 119 to Chinese Patent Application No. 202210304383.6 filed on Mar. 25, 2022, in the Chinese Intellectual Property Office, the disclosure of which is incorporated by reference herein in its entirety.

BACKGROUND

1. Field

The present disclosure relates to image processing, and more particularly, to an image processing method and an electronic device performing the image processing method.

2. Description of the Related Art

In order to improve quality of images captured by electronic devices, a complementary metal oxide semiconductor (CMOS) sensor that supports multi pixels-in-one technology has been introduced. However, in generally, there is a problem that image quality of an image generated based on an output of such CMOS sensor is low.

Therefore, a technique for improving the image quality is required.

SUMMARY

According to an embodiment, an image processing method includes: receiving a raw image of an image sensor as a first image; performing remosaicing on the first image to generate a second image in Bayer format; and generating a full resolution image as an output image based on the second image, wherein the performing of the remosaicing on the first image includes: converting the first image into a first color image, adjusting the first color image to generate a second color image, and converting the second color image into the second image in Bayer format, and wherein the adjusting of the first color image to generate the second color image includes: performing false color correction on the first color image, and re-correcting an over-correction caused in performing the false color correction to generate the second color image.

The generating of the full resolution image based on the second image includes: in response to an illuminance condition of environment in which the image sensor captures the first image is a first illuminance condition, generating the full resolution image by performing post-processing on the second image, wherein, the first illuminance condition represents that an illuminance of the environment in which the image sensor captures the first image is greater than a predetermined threshold.

The generating of the full resolution image based on the second image includes: in response to an illuminance condition of environment in which the image sensor captures the first image is a second illuminance condition, extracting high-frequency details from the second image, to generate a third image in Bayer format that contains the extracted high-frequency details, performing upscaling on a binning pixel image to generate a fourth image in Bayer format, a resolution of the fourth image being the same as that of the third image, generating a fifth image in Bayer format by combining pixel values of pixels at corresponding positions of the third image and the fourth image, and generating the full resolution image by performing post-processing on the fifth image, wherein the second illuminance condition represents that an illuminance of the environment in which the image sensor captures the first image is less than or equal to a predetermined threshold, and wherein the binning pixel image represents a multi pixels-in-one image corresponding to the first image.

The performing of the false color correction on the first color image includes: generating a third color image by performing blur processing on the first color image; the re-correcting of the over-correction caused in performing the false color correction includes: adjusting a high frequency part of the first color image, and generating the second color image based on the adjusted high frequency part of the first color image and the third color image.

The high frequency part of the first color image is obtained based on the first color image and the third color image; the high frequency part of the first color image is obtained by: for each pixel of the first color image, subtracting a red component, a green component, and a blue component of a corresponding pixel in the third color image from a red component, a green component, and a blue component of each pixel in the first color image, respectively; the adjusting of the high frequency part of the first color image includes: generating the adjusted high frequency part of the first color image by multiplying a red component, a green component, and a blue component of each pixel in the high frequency part of the first color image by a debugging value; the generating of the second color image based on the adjusted high frequency part of the first color image and the third color image includes: for each pixel in the adjusted high frequency part of the first color image, adding a red component, a green component, and a blue component of each pixel in the adjusted high frequency part of the first color image in a red component, a green component, and a blue component of a corresponding pixel in the third color image, to generate the second color image.

The converting of the second color image into the second image includes: determining an arrangement manner of color channels of the second image and a color channel of each pixel of the second image according to an arrangement manner of color channels of the first image; for each pixel having a green channel of the second image, determining a pixel value of the pixel of the second image based on a green component of a corresponding pixel of the second color image; and for each pixel not having the green channel of the second image, determine whether a color channel of the pixel of the second image is the same as a color channel of a corresponding pixel of the first image, when the color channel of the pixel of the second image is the same as the color channel of the corresponding pixel of the first image, determining the pixel value of the pixel of the second image based on a first color component of the corresponding pixel of the second color image, when the color channel of the pixel of the second image is different from the color channel of the corresponding pixel of the first image, determining the pixel value of the pixel of the second image based on a red component, a green component, a blue component of the corresponding pixel of the second color image, wherein a color channel corresponding to the first color component is the same as the color channel of the pixel of the second image.

The converting of the first image into the first color image includes: determining an interpolation direction of a green component of each pixel of the first color image, and generating the first color image by performing direction interpolation on the first image based on the interpolation direction.

The generating of the full resolution image as the output image based on the second image includes: in response to an illuminance condition of environment in which the image sensor captures the first image is a first illuminance condition, generating the full resolution image as the output image by performing post-processing on the second image, the image processing method further including: in response to the illuminance condition of the environment in which the image sensor captures the first image is a second illuminance condition, generating the output image by performing the post-processing on a binning pixel image, wherein the first illuminance condition represents that an illuminance of the environment in which the image sensor captures the first image is greater than a predetermined threshold, wherein the second illuminance condition represents that the illuminance of the environment in which the image sensor captures the first image is less than or equal to the predetermined threshold, and wherein the binning pixel image represents a multi pixels-in-one image corresponding to the first image.

The converting of the first image into the first color image includes: determining an interpolation direction of a green component of each pixel of the first color image, and generating the first color image by performing direction interpolation on the first image based on the interpolation direction The generating of the first color image by performing the direction interpolation on the first image based on the interpolation direction includes: selecting a predetermined filter based on a color channel of each pixel of the first image, a block centered on each pixel of the first image, and an interpolation direction of a green component of a corresponding pixel of the first color image, and determining a green component of the corresponding pixel of the first color image based on the predetermined filter and the block centered on each pixel of the first image, determining a red component and a blue component of the corresponding pixel of the first color image based on the color channel of each pixel of the first image.

The image sensor is a multi pixels-in-one CMOS sensor.

The post-processing includes: a process for converting an image in Bayer format into an image of RGB format and a process for converting the image of RGB format into an image of YUV format.

According to an embodiment, an image processing method includes: receiving a raw image of an image sensor as a first image; performing a predetermined neural network by using the first image to generate a second color image; converting the second color image into a second image in Bayer format; and generating a full resolution image based on the second image, wherein the predetermined neural network is pre-trained based on a plurality of training data, wherein each of the plurality of training data includes: the raw image received from the image sensor and a target color image corresponding to the raw image, wherein the target color image corresponding to the raw image is generated by: converting the raw image into a first color image, and performing false color correction on the first color image, and re-correcting an over-correction caused in performing the false color correction to generate the target color image.

The converting of the second color image into the second image includes: determining an arrangement manner of color channels of the second image and a color channel of each pixel of the second image according to an arrangement manner of color channels of the first image; for each pixel of the second image, determine whether a color channel of the pixel of the second image is the same as a color channel of a corresponding pixel of the first image, when the color channel of the pixel of the second image is the same as the color channel of the corresponding pixel of the first image, determining the pixel value of the pixel of the second image based on a first color component of the corresponding pixel of the second color image, when the color channel of the pixel of the second image is different from the color channel of the corresponding pixel of the first image, determining the pixel value of the pixel of the second image based on a red component, a green component, a blue component of the corresponding pixel of the second color image, wherein a color channel corresponding to the first color component is the same as the color channel of the pixel of the second image.

According to an embodiment, an image processing method includes: receiving a raw image of an image sensor as a first image; performing remosaicing on the first image to generate a second image in Bayer format; extracting high-frequency details from the second image, to generate a third image in Bayer format that contains the extracted high-frequency details; performing upscaling on a binning pixel image to generate a fourth image in Bayer format; generating a fifth image in Bayer format by combining pixel values of pixels at corresponding positions of the third image and the fourth image; and generating a full resolution image by performing post-processing on the fifth image, wherein the binning pixel image represents a multi pixels-in-one image corresponding to the first image.

According to an embodiment, an electronic device includes: an image sensor configured to generate a raw image as a first image; and an image signal processor configured to perform the method.

According to an embodiment, a non-transitory computer-readable storage medium stores instructions that, when executed by a processor, cause the processor to execute the method.

The image processing method and the electronic device according to one or more embodiments may improve image abnormal performance and increase SNR of the image.

Other aspects and/or advantages of the present disclosure will be partially described in the following description, and part will be clear through the description or may be learn through the practice of the present disclosure.

BRIEF DESCRIPTION OF THE DRAWINGS

The above and other aspects and features will become more apparent by describing certain embodiments with reference to the accompanying drawings, in which:

FIG. 2 is a diagram showing raw images of a CMOS sensor according to an embodiment;

FIG. 6 shows a flowchart of generating a full resolution image based on the second image according to an embodiment;

DETAILED DESCRIPTION

Figure 1:
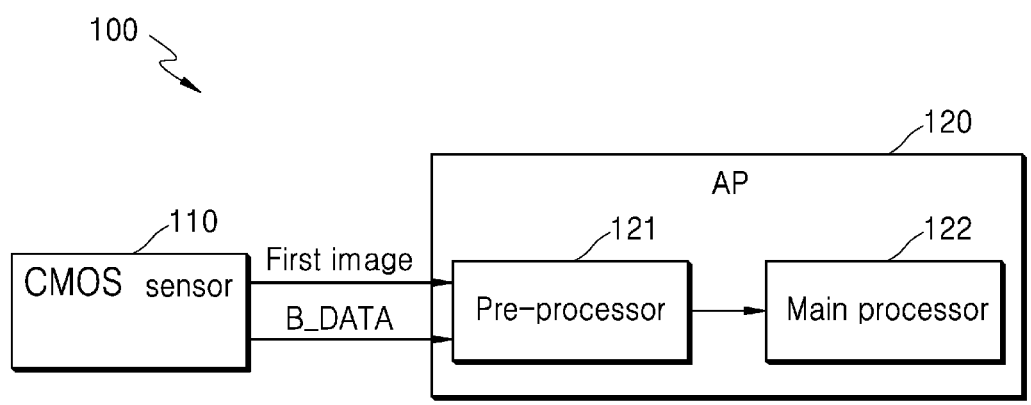
FIG. 1 is a block diagram showing an electronic device according to an embodiment.

Certain embodiments will be described in detail with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms "a", "an", and "the" are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined, all terms including technical or scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, examples will be described in detail with reference to the accompanying drawings. Regarding the reference numerals assigned to the elements in the drawings, it should be noted that the same elements will be designated by the same reference numerals, and redundant descriptions thereof will be omitted.

FIG. 1 is a block diagram showing an electronic device according to an embodiment. FIG. 2 is a diagram showing raw images of a CMOS sensor.

The electronic device according to one or more embodiments may include, for example, mobile phone, tablet personal computer (PC), personal digital assistant (PDA), etc. However, this is not limiting, and the electronic device according to an embodiment may be any electronic device having an image collection function.

As shown in FIG. 1, the electronic device 100 according to an embodiment may include a CMOS sensor 110, e.g., an image sensor, and an application processor (AP) 120. In one or more embodiments, the AP 120 may include a pre-processor 121 and a main processor 122. However, an embodiment is not limited thereto, and the pre-processor 121 and the main processor 122 may be integrated as a single processor, and operations performed by the pre-processor 121 and the main processor 122 are performed by the single processor AP 120.

The CMOS sensor 110 may be a CMOS sensor supporting multi pixels-in-one technology.

For example, the CMOS sensor 110 may be a CMOS sensor supporting four-in-one technology (Tetra CMOS sensor), or a CMOS sensor supporting nine-in-one technology (Nona CMOS sensor). However, an embodiment is not limited thereto, and the CMOS sensor 110 may also be a CMOS sensor supporting other multi pixels-in-one technology.

The CMOS sensor 110 may generate a raw image as a first image (e.g., Tetra Bayer), and send the first image to the pre-processor 121. For example, for a CMOS sensor of n pixels-in-one, the raw image includes pixel blocks of different color channels, and each pixel block includes adjacent n pixels having a same color channel.

As shown in FIG. 2, when the CMOS sensor 110 is the Tetra CMOS sensor, each pixel block in the raw image includes adjacent 4 pixels having a same color channel. As shown in FIG. 2, when the CMOS sensor 110 is the Nona CMOS sensor, each pixel block in the raw image includes adjacent 9 pixels having a same color channel. In FIG. 2, Gr and Gb represent pixels having a green channel, R represents a pixel having a red channel, and B represents a pixel having a blue channel.

In addition, the CMOS sensor 110 may also generate a binning pixel image (B_DATA), as a multi pixels-in-one image, corresponding to the first image, and send the binning pixel image to the pre-processor 121. In one or more embodiments, the CMOS sensor 110 generates the binning pixel image by binning n pixels being adjacent and having a same color channel in each pixel block of the first image as one pixel. In another example embodiment, the pre-processor 121 may convert the first image into the binning pixel image.

According to one or more embodiments, the AP 120 may receive the first image, perform remosaicing on the first image to generate a second image in Bayer format, and generate a full resolution image based on the second image.

According to one or more embodiments, the AP 120 may perform the remosaicing on the first image by converting the first image into a first color image, adjusting the first color image to generate a second color image, and converting the second color image into the second image in Bayer format. According to one or more embodiments, the pre-processor 121 may also perform processing such as disparity compensation, despeckle, and the like on the first image before performing the remosaicing. However, an embodiment is not limited to thereto, and the pre-processor 121 may also perform any other applicable processing before or after performing the remosaicing.

According to one or more embodiments, the AP 120 may adjust the first color image by performing false color correction on the first color image, and re-correcting an over-correction caused in performing the false color correction to generate the second color image.

The image processing method according to an embodiment is described below in connection with FIG. 3.

Figure 3:
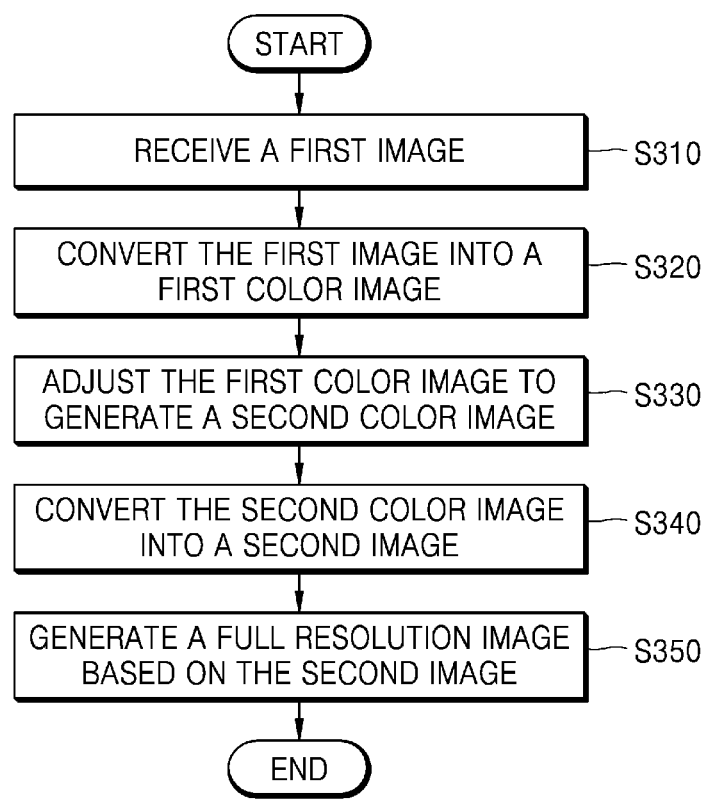
FIG. 3 shows a flowchart of an image processing method according to an embodiment.

FIG. 3 shows a flowchart of an image processing method according to an embodiment.

As shown in FIG. 3, in operation S310, the AP 120 may receive a first image.

In operation S320, the AP 120 may convert the first image into a first color image.

According to one or more embodiments, the AP 120 may firstly determine an interpolation direction of a green component of each pixel of the first color image based on the first image, and then generate the first color image by performing direction interpolation on the first image based on the interpolation direction. The method of converting the first image into the first color image is described below in connection with FIGS. 7A-7C.

In operation S330, the AP 120 may adjust the first color image to generate a second color image. The flowchart of adjusting the first color image to generate the second color image is described below in connection with FIG. 4.

In operation S340, the AP 120 may convert the second color image into a second image in Bayer format. The method of converting the second color image into the second image in Bayer format is described below in connection with FIGS. 5A and 5B.

In operation S350, the AP 120 may generate a full resolution image based on the second image. The flowchart of generating the full resolution image based on the second image is described below in connection with FIG. 6.

Figure 4:
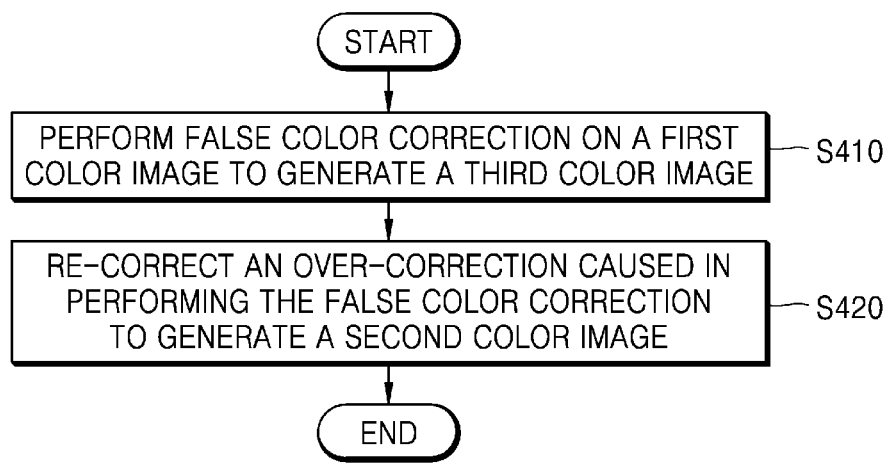
FIG. 4 shows a flowchart of adjusting a first color image to generate a second color image according to an embodiment.

FIG. 4 shows a flowchart of adjusting a first color image to generate a second color image according to an embodiment.

Referring to FIG. 4, in operation S410, the pre-processor 121 may perform false color correction on a first color image to generate a third color image.

According to one or more embodiments, the false color correction is performed and the third color image is generated by performing blur processing on the first color image. According to one or more embodiments, the blur processing may be performed on the first color image by applying a one-dimensional low-pass filter to the first color image according to an interpolation direction of a green component of each pixel of the first color image.

According to one or more embodiments, for a first pixel of the first color image, the pre-processor 121 may firstly determine a first block centered on the first pixel, and then generate a green component of a pixel, corresponding to the first pixel, of the third color image based on an interpolation direction of a green component of the first pixel and green components of a plurality of pixels, including the first pixel and arranged along the interpolation direction, of the first block.

For example, when the interpolation direction of the green component of the first pixel of the first color image is a horizontal direction and the first block is a block of N×M (for example, each of N and M is an integer greater than or equal to 1), the pre-processor 121 may determine a weighted average value of green components of the N pixels, arranged in the horizontal direction and including the first pixel, in the first block as the green component of the pixel, corresponding to the first pixel, of the third color image.

In addition, the pre-processor 121 may generate a red component of the pixel, corresponding to the first pixel, of the third color image based on the interpolation direction of the green component of the first pixel and red components of the plurality of pixels of the first block, and generate a blue component of the pixel, corresponding to the first pixel, of the third color image based on the interpolation direction of the green component of the first pixel and blue components of the plurality of pixels of the first block, wherein the plurality of pixels include the first pixel and are arranged along the interpolation direction.

The method of performing the false color correction described above is an example; however, an embodiment is not limited thereto, and other false color correction algorithms, e.g., of the related art, may also be used.

There may be a problem of an over-correction in performing the false color correction. In operation S420, the pre-processor 121 may re-correct the over-correction caused in performing the false color correction to generate a second color image.

The pre-processor 121 may adjust a high frequency part of the first color image, and generate the second color image based on the adjusted high frequency part of the first color image and the third color image.

According to one or more embodiments, the pre-processor 121 may obtain the high frequency part of the first color image based on the first color image and the third color image. For example, the pre-processor 121 may, for each pixel of the first color image, subtract a red component, a green component, and a blue component of a corresponding pixel in the third color image from a red component, a green component, and a blue component of each pixel in the first color image, respectively, to obtain a red component, a green component, and a blue component of a corresponding pixel in the high frequency part of the first color image.

According to one or more embodiments, the pre-processor 121 may generate the adjusted high frequency part of the first color image by multiplying a red component, a green component, and a blue component of each pixel in the high frequency part of the first color image by a debugging value, respectively. The adjustment of the high frequency part of the first color image may be represented as the following equation (1):

$$HF_{R,G,B} = \text{coefficient} \times (Full_{R,G,B} - Blur_{R,G,B}) \quad \text{Equation (1)}$$

In the equation (1), $HF_{R,G,B}$ represents the adjusted high frequency part of the first color image, $Full_{R,G,B}$ represents the first color image, $Blur_{R,G,B}$ represents the third color image, and coefficient represents the debugging value.

According to one or more embodiments, the pre-processor 121 may, for each pixel in the adjusted high frequency part of the first color image, add a red component, a green component, and a blue component of each pixel in the adjusted high frequency part of the first color image to a red component, a green component, and a blue component of a corresponding pixel in the third color image, to generate the second color image.

Figure 5A:
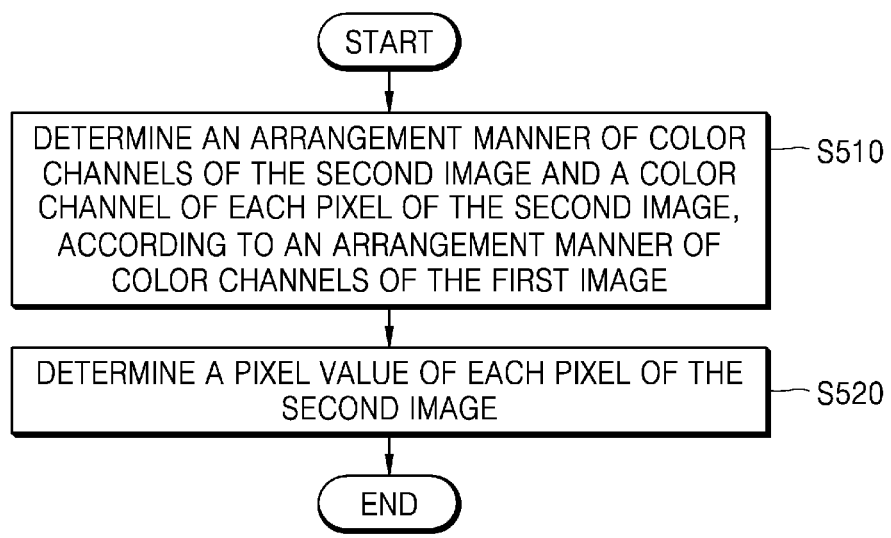
FIGS. 5A and 5B show a method of converting the second color image into a second image in Bayer format according to an embodiment.
Figure 5B:
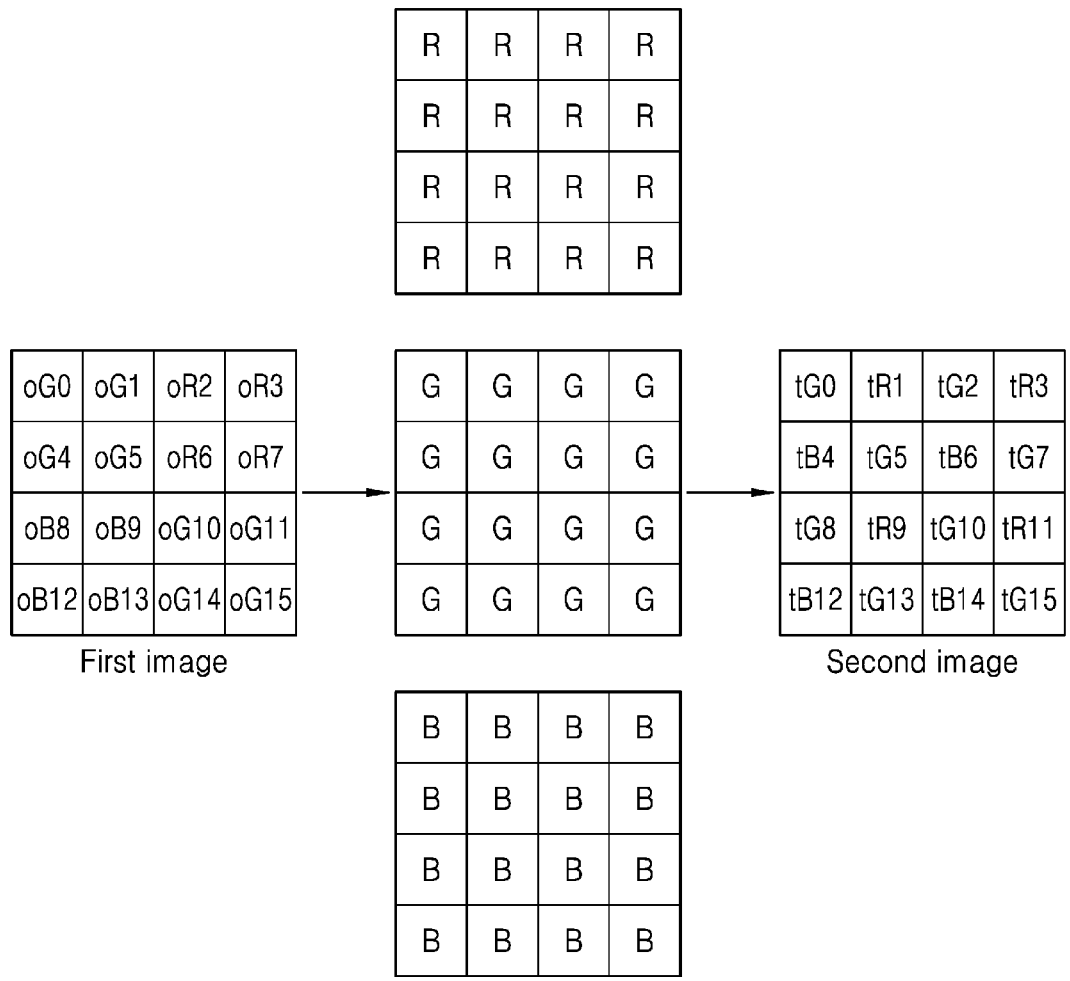

FIGS. 5A and 5B show a method of converting a second color image into a second image in Bayer format according to an embodiment.

As shown in FIG. 5A, in operation S510, the pre-processor 121 may determine an arrangement manner of color channels of the second image and a color channel of each pixel of the second image, according to an arrangement manner of color channels of the first image.

According to one or more embodiments, the pre-processor 121 may determine an arrangement manner of color channels of pixel blocks of the first image. For example, as shown in FIG. 5B, the arrangement manner of the color channels of the pixel blocks of the first image is a green channel, a red channel, a blue channel and a green channel. In FIG. 5B, oG0, oG1, oG4, oG5, oG10, oG11, oG14 and oG15 represent pixels having the green channel, oR2, oR3, oR6, and oR7 represent pixels having the red channel, and oB8, oB9, oB12, and oB13 represent pixels having the blue channel.

According to one or more embodiments, the pre-processor 121 may determine an arrangement manner of color channels of n pixels, at positions corresponding to positions of n pixels of each pixel block of the first image, of the second image, based on the arrangement manner of the color channels of the pixel blocks of the first image. For example, as shown in FIG. 5B, an arrangement manner of color channels of 4 pixels, corresponding to each pixel block, of the second image is the green channel, the red channel, the blue channel, and the green channel. After determining the arrangement manner of the color channels of the second image in Bayer format, the pre-processor 121 may determine a color channel of each pixel of the second image. In FIG. 5B, tG0, tG2, tG5, tG7, tG8, tG10, tG13, and tG15 represent pixels having the green channel, tR1, tR3, tR9, and tR11 represent pixels having the red channel, and tB4, tB6, tB12, and tB14 represent pixels having the blue channel.

In operation S520, the pre-processor 121 may determine a pixel value of each pixel of the second image.

According to one or more embodiments, for each pixel having a green channel of the second image, the pre-processor 121 may determine a pixel value of the pixel of the second image based on a green component of a corresponding pixel of the second color image.

For example, for a pixel tG0 of the second image, a corresponding pixel of the first image is oG0, and a color channel of the pixel tG0 of the second image is a green channel. A green component of a pixel, corresponding to the pixel tG0 of the second image, of the second color image may be determined as a pixel value of the pixel tG0 of the second image.

According to one or more embodiments, for each pixel not having the green channel of the second image, the pre-processor 121 may determine whether a color channel of the pixel of the second image is the same as a color channel of a corresponding pixel of the first image.

When the color channel of the pixel of the second image is the same as the color channel of the corresponding pixel of the first image, the pre-processor 121 may determine the pixel value of the pixel of the second image based on a first color component of a corresponding pixel of the second color image. For example, a color channel corresponding to the first color component is the same as the color channel of the pixel of the second image.

When the color channel of the pixel of the second image is different from the color channel of the corresponding pixel of the first image, the pre-processor 121 may determine the pixel value of the pixel of the second image based on a red component, a green component, a blue component of the corresponding pixel of the second color image.

For example, for a pixel tR3 of the second image, a corresponding pixel of the first image is oR3, and a color channel of the pixel tR3 of the second image is the same as a color channel of the corresponding pixel oR3 of the first image and is the red channel. A red component of a pixel, corresponding to the pixel tR3 of the second image, of the second color image may be determined as a pixel value of the pixel oR3 of the second image.

For example, for a pixel tR1 of the second image, a corresponding pixel of the first image is oG1, and a color channel of the pixel tR1 of the second image is different from a color channel of the corresponding pixel oG1 of the first image. A pixel value of the pixel tR1 of the second image may be determined based on a red component, a green component, and a blue component of a pixel, corresponding to the pixel tR1 of the second image, of the second color image using the BT.601 standard.

According to one or more embodiments, a pixel value of each pixel of the second image may be expressed as the following equation (2):

$$\text{eachPixel}_Y = \frac{L1 \times R + L2 \times G + L3 \times B}{256} \quad \text{Equation (2)}$$

In equation (2), eachPixel$_Y$ represents a pixel value (for example, a brightness value) of each pixel of the second image; R, G, and B represent a red component, a green component, and a blue component of a pixel, corresponding to a pixel of the second image, of the second color image; L1, L2, and L3 represent a first weight, a second weight, and a third weight to be applied to the red component, the green component, and the blue component, respectively.

As shown above, in FIG. 5B, for pixels tG0, tG2, tG5, tG7, tG8, tG10, tG13, tG15, L1 and L3 are 0, and L2 is equal to 256; for pixels tR3, L2 and L3 are equal to 0, and L1 is 256; for pixel tB12, L1 and L2 are 0, and L3 is equal to 256; for other pixels, L1, L2, and L3 may be determined using the BT.601 standard.

The method of converting the color image into the image in Bayer format described above is an example; however, an embodiment is not limited thereto, and other method of converting the color image into the image in Bayer format, e.g., of the related art, may also be used.

FIG. 6 shows a flowchart of generating a full resolution image based on a second image according to an embodiment.

In operation S610, the AP 120 determines an illuminance condition of environment in which the CMOS sensor 110 captures a first image.

According to one or more embodiments, whether the illuminance condition of the environment in which the CMOS sensor 110 captures the first image is a high illuminance condition or a low illuminance condition may be determined, by a mode selector or an illuminance sensor provided inside or outside the AP 120.

For example, when an illuminance of the environment in which the CMOS sensor 110 captures the first image is greater than a predetermined threshold, the AP 120 may determine the illuminance condition as the high illuminance condition; and when the illuminance of the environment in which the CMOS sensor 110 captures the first image is less than or equal to the predetermined threshold, the AP 120 may determine the illuminance condition as the low illuminance condition.

When the illuminance condition of the environment in which the CMOS sensor 110 captures the first image is the high illuminance condition, in operation S620, the main processor 122 may perform post-processing on the second image to generate the full resolution image.

When the illuminance condition of the environment in which the CMOS sensor 110 captures the first image is the low illuminance condition, in operation S630, the pre-processor 121 may extract high-frequency details from the second image, to generate a third image in Bayer format that contains the extracted high-frequency details. The high-frequency details may include at least one of edges, textures, and the like.

Here, methods to extract the high-frequency details include, but are not limited to edge detection based on canny algorithm, wavelet transform algorithm, sobel filter, Prewitt filter, Laplace filter, etc.

In operation S640, the pre-processor 121 may obtain a binning pixel image.

In one or more embodiments, the pre-processor 121 may obtain the binning pixel image by receiving the binning pixel image from the CMOS sensor 110 or converting the first image into the binning pixel image.

In operation S650, the pre-processor 121 may perform upscaling on the binning pixel image to generate a fourth image in Bayer format, a resolution of the fourth image being the same as that of the third image.

Here, the method of performing upscaling on the binning pixel image includes, but is not limited to, bi-cubic interpolation or cubic spline interpolation.

In operation S660, the pre-processor 121 may combine pixel values of pixels at corresponding positions of the third image and the fourth image to generate a fifth image in Bayer format.

According to one or more embodiments, a method of combining the pixel values of the pixels at the corresponding positions of the third image and the fourth image may include obtaining weighted average values of the pixel values of the pixels at the corresponding positions of the third image and the fourth image. However, an embodiment is not limited to thereto, and other methods of combining the pixel values of the pixels at the corresponding positions of the third image and the fourth image may also be applied.

In operation S670, the main processor 122 may perform the post-processing on the fifth image to generate the full resolution image.

According to one or more embodiments, the method of generating the second image when the illuminance condition of the environment in which the CMOS sensor 110 captures the first image is the high illuminance condition is not limited to those described in FIGS. 3 to 5B and 8. For example, the second image may be generated by performing hardware remosaicing on the first image using the CMOS sensor 110, or the second image may be generated by performing other remosaic algorithms on the first image using the AP 120.

In an embodiment, the full resolution image is generated based on the second image generated by performing the remosaicing on the raw image of the CMOS sensor and the third image generated by upscaling the binning pixel image under the low illuminance condition, which may improve the SNR of the image output by the AP under the low illuminance condition.

Figure 7A:
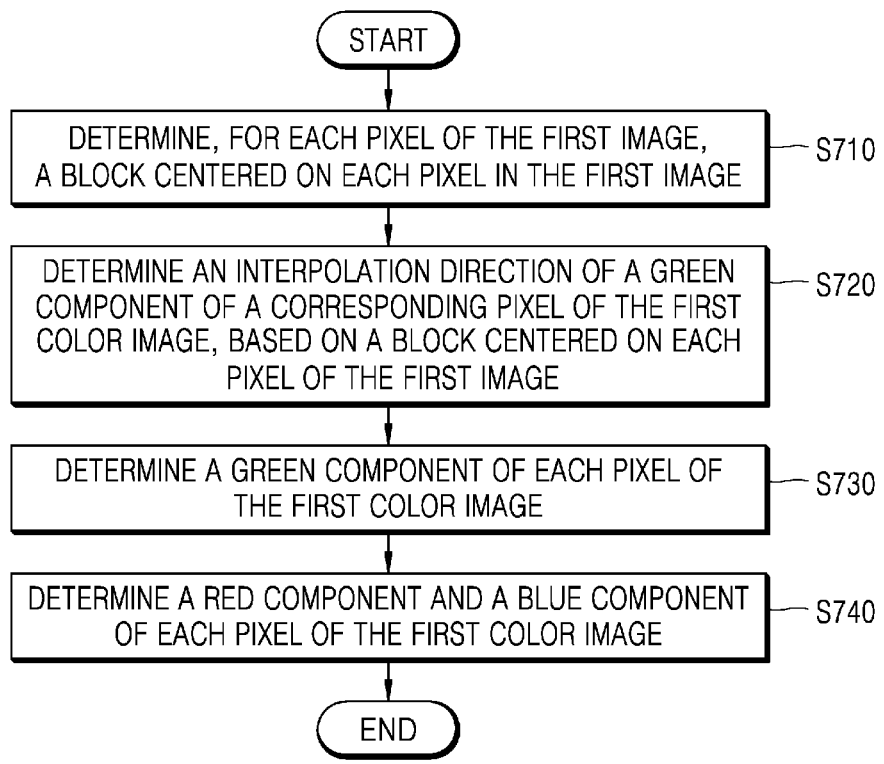
FIGS. 7A, 7B, and 7C show a method of converting a first image into the first color image according to an embodiment.
Figure 7B:
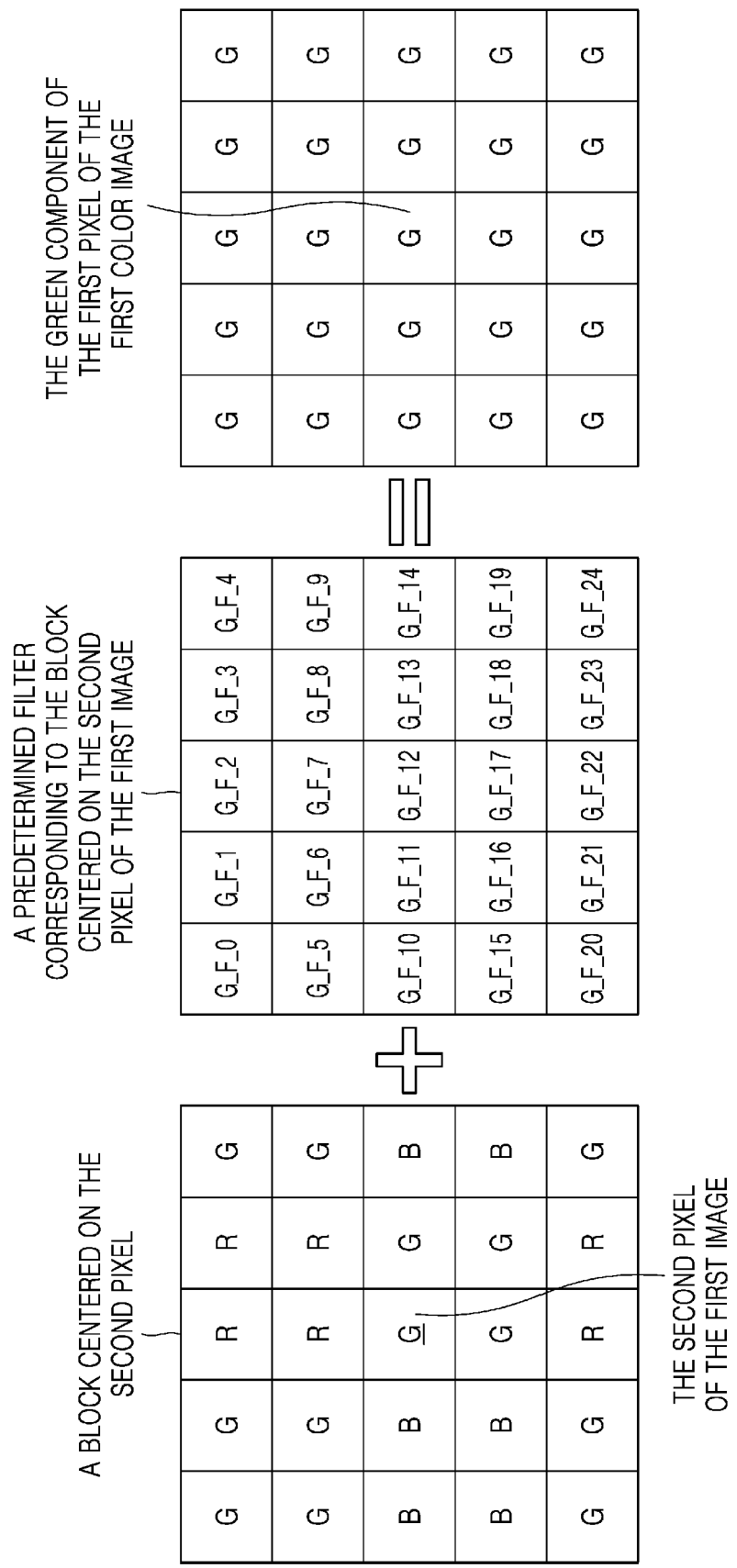
Figure 7C:
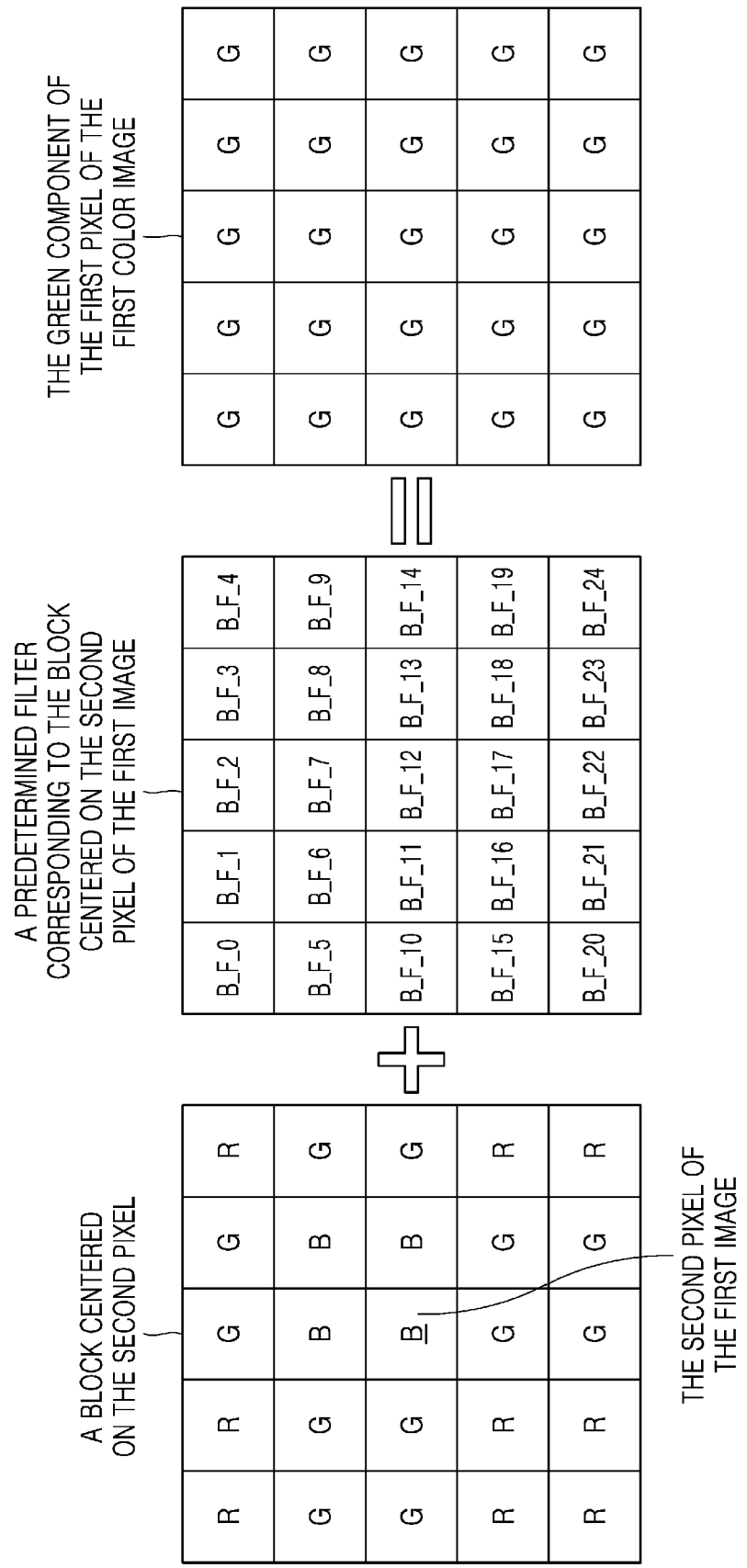

FIGS. 7A to 7C show a method of converting a first image into a first color image according to an embodiment.

As shown in FIG. 7A, in operation S710, the AP 120 may determine, for each pixel of the first image, a block centered on each pixel in the first image (e.g., a block of N×M centered on each pixel where each of N and M is an integer greater than or equal to 1).

In operation S720, the AP 120 may determine an interpolation direction of a green component of a corresponding pixel of the first color image, for each pixel of the first image, based on the block centered on each pixel of the first image. For example, in order to determine an interpolation direction of a green component of a first pixel of the first color image, the AP may first determine, in the first image, a block centered on a second pixel, corresponding to the first pixel of the first color image in position, of the first image, calculate a plurality of grade values corresponding to a plurality of directions based on the block, and determine a direction corresponding to the maximum grade value as the interpolation direction of the green component of the first pixel of the first color image. However, an embodiment is not limited to a method using the maximum grade value, and other methods of determining the interpolation direction of the green component of the corresponding pixel of the first color image based on the block centered on each pixel of the first image may be used.

In operation S730, the AP 120 may determine a green component of a corresponding pixel of the first color image, based on the block centered on each pixel of the first image and the interpolation direction of the green component of the corresponding pixel of the first color image.

For example, in order to determine the green component of the first pixel of the first color image, the AP 120 may, based on a color channel of the second pixel, corresponding to the first pixel of the first color image, of the first image, a block centered on the second pixel of the first image, and the interpolation direction of the green component of the first pixel of the first color image, select a predetermined filter corresponding to the block centered on the second pixel of the first image (wherein the block centered on the second pixel of the first image is the same as the predetermined filter in size).

Then, the AP 120 may determine the green component of the first pixel of the first color image based on the predetermined filter and the block centered on the second pixel of the first image. For example, the AP 120 may multiply the pixel value of each pixel of the block centered on the second pixel of the first image by the corresponding weight of the predetermined filter and sum up a result of the multiplication, to determine the green component of the corresponding pixel of the first color image.

According to one or more embodiments, when the color channel of the second pixel of the first image is the green channel, the selected predetermined filter may be a filter in which, among multiple weights arranged along the interpolation direction and including the weight at a center position of the predetermined filter, weights corresponding to pixels having the green channel in the block centered on the second pixel of the first image are non-zero values, and the remaining weights are zero values; the weight at the center position is largest, and the closer to the center position, the larger the weight; in addition, weights of the predetermined filter except the above-mentioned multiple weights are zero values.

For example, when the color channel of the second pixel of the first image is a blue channel or a red channel, the selected predetermined filter is a filter in which, among the multiple weights arranged along the interpolation direction and including the weight at the center position of the predetermined filter, the weights corresponding to the pixels having the green channel in the block centered on the second pixel of the first image are non-zero values, and the remaining weights are zero values; the closer to the center position, the larger the weight; in addition, weights of the predetermined filter except the above-mentioned multiple weights are zero values.

For example, as shown in FIG. 7B, in order to determine the green component of the first pixel of the first color image, the AP 120 may determine, in the first image, a block centered on the second pixel (G indicated by a underline), corresponding to the first pixel of the first color image, of the first image, and then determine the predetermined filter corresponding to the block centered on the second pixel.

In this example, the color channel of the second pixel of the first image is the green channel. Assuming that the interpolation direction of the first pixel of the first color image is a horizontal direction, among multiple weights G_F_10 to G_F_14 arranged along the horizontal direction and including the weight G_F_12 at the center position of the predetermined filter, G_F_12 and G_F_13 are non-zero values, G_F_10, G_F_11, and G_F_14 are zero values, and G_F_12 is greater than G_F_13 in the predetermined filter; in addition, weights of the predetermined filter except the weights G_F_10 to G_F_14 are zero values.

For example, as shown in FIG. 7C, in order to determine the green component of the first pixel of the first color image, the AP 120 may determine, in the first image, a block centered on the second pixel (B indicated by a underline), corresponding to the first pixel of the first color image, of the first image, and then determine the predetermined filter corresponding to the block centered on the second pixel.

In this example, the color channel of the second pixel of the first image is the blue channel. Assuming that the interpolation direction of the first pixel of the first color image is the horizontal direction, among multiple weights B_F_10 to B_F_14 arranged along the horizontal direction and including the weight B_F_12 at the center position of the predetermined filter, B_F_10, B_F_11, and B_F_14 are non-zero values, B_F_12 and B_F_13 are zero values, and B_F_11 is greater than B_F_10 in the predetermined filter; in addition, weights of the predetermined filter except the weights B_F_10 to B_F_14 are zero values.

In operation S740, the AP 120 may determine a red component and a blue component of the corresponding pixel of the first color image based on the color channel of the pixel of the first image.

For example, the AP 120 may determine whether a color channel of each pixel of the first image is a red channel. When the color channel of the pixel of the first image is the red channel, the AP 120 may determine the pixel value of the pixel of the first image as the red component of the corresponding pixel of the first color image. When the color channel of the pixel of the first image is not the red channel, the AP 120 may determine the red component of the corresponding pixel of the first color image based on pixels, closest to the pixel and having the red channel, of the first image using nearest neighbor interpolation. Alternatively, the AP 120 may determine the red component of the corresponding pixel of the first color image based on a block centered on the pixel of the first image using bilinear interpolation. In addition, the AP 120 may use a similar method to determine the blue component of the pixels of the first color image.

The method of converting the raw image of the CMOS sensor into the color image described above is an example; however, an embodiment is not limited thereto, and other methods of converting the raw image of the CMOS sensor into the color image, e.g., of the related art, may also be used.

Figure 8:
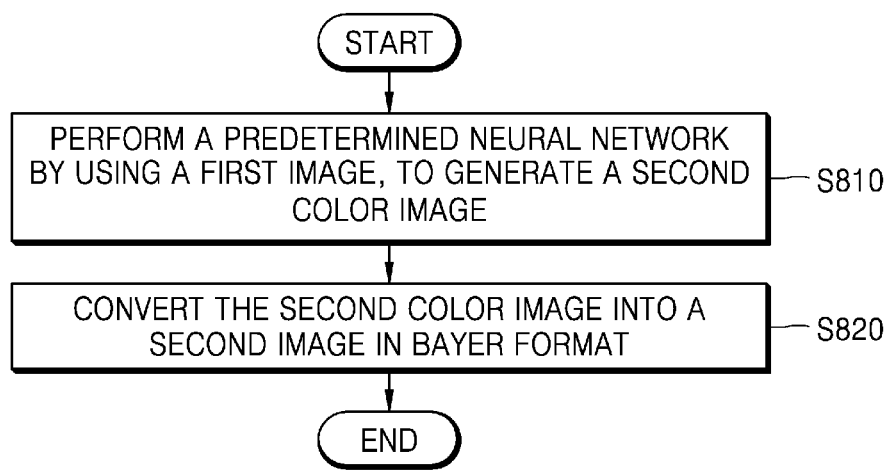
FIG. 8 shows a flowchart of performing remosaicing according to an embodiment.

FIG. 8 shows a flowchart of performing remosaicing according to an embodiment.

In operation S810, the pre-processor 121 uses a predetermined neural network on a first image, to generate a second color image.

Here, the predetermined neural network may include at least one of various types of neural network models, e.g., a convolution neural network (CNN), a region with convolution neural network (R-CNN), a generative adversarial network (GAN), a region proposal network (RPN), a recurrent neural network (RNN), a stacking-based deep neural network (S-DNN), a state space dynamic neural network (S-SDNN), a deconvolution network, a deep belief network (DBN), a restricted Boltzmann machine (RBM), a fully convolutional network, a long short-term memory (LSTM) network, a classification network, a plain residual network, a dense network, a hierarchical pyramid network, and the like.

In operation S820, the pre-processor 121 may convert the second color image into a second image in Bayer format. In one or more embodiments, the second color image may be converted into the second image in Bayer format by determining a color channel of each pixel of the second image and determining a pixel value of each pixel of the second image.

In one or more embodiments, processing of determining the color channel of each pixel of the second image and the process of determining the pixel value of each pixel of the second image may be performed with reference to the processing described in FIGS. 5A and 5B. However, an embodiment is not limited to thereto, and the pixel value of each pixel of the second image may be determined by a following manner.

Specifically, for each pixel of the second image, the pre-processor 121 may only determine whether a color channel of the pixel of the second image is the same as a color channel of a corresponding pixel of the first image.

When the color channel of the pixel of the second image is the same as the color channel of the corresponding pixel of the first image, the pre-processor 121 may determine the pixel value of the pixel of the second image based on a first color component of the corresponding pixel of the second color image. For example, a color channel corresponding to the first color component is the same as the color channel of the pixel of the second image.

When the color channel of the pixel of the second image is different from the color channel of the corresponding pixel of the first image, the pre-processor 121 may determine the pixel value of the pixel of the second image based on a red component, a green component, a blue component of the corresponding pixel of the second color image.

According to one or more embodiments, the predetermined neural network may be pre-trained based on a plurality of training data. Each of the plurality of training data may include a raw image of the CMOS sensor 110 and a target color image corresponding to the raw image. In one or more embodiments, the target color image may be generated by converting the raw image into the first color image, performing false color correction on the first color image, and re-correcting the overcorrection caused in performing the false color correction.

In an embodiment, the second image is generated by performing the remosaicing described with reference to FIGS. 3 to 5B and 8 on the raw image of the CMOS sensor using the AP 120 under the high illuminance condition, and the full resolution image is generated based on the second image, which may improve abnormal performance (e.g., maze pattern noise, checker artifacts, purple edge, false color, etc.) of the full resolution images output by the AP 120 under the high illuminance condition.

Figure 9:
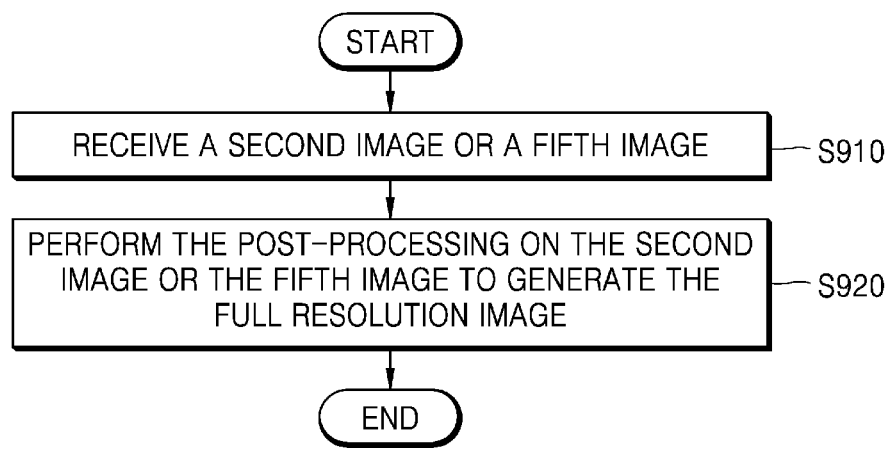
FIG. 9 shows a flowchart of generating the full resolution image according to an embodiment.

FIG. 9 shows a flowchart of generating a full resolution image according to an embodiment.

In operation S910, the main processor 122 may receive a second image or a fifth image from the pre-processor 121.

When the illuminance condition determined by the mode selector is the high illuminance condition, the main processor 122 may receive the second image, and when the illuminance condition determined by the mode selector is the low illuminance condition, the main processor 122 may receive the fifth image.

In operation S920, the main processor 122 may perform the post-processing on the second image or the fifth image to generate the full resolution image.

In one or more embodiments, the post-processing performed on the second image or the fifth image refers to a conventional processing of image signal. For example, the post-processing may include a process for converting an image in Bayer format into an image in RGB format (for example, demosaic) and/or a process for converting the image in RGB format to an image in YUV format (for example, RGB2YUV).

However, an embodiment is not limited to thereto, and the post-processing performed on the second image or the fifth image may also include at least one of black level correction, lens shading correction, Bayer noise reduction, automatic exposure, automatic white balance, automatic focusing, sharpening, and YUV noise reduction.

Figure 10:
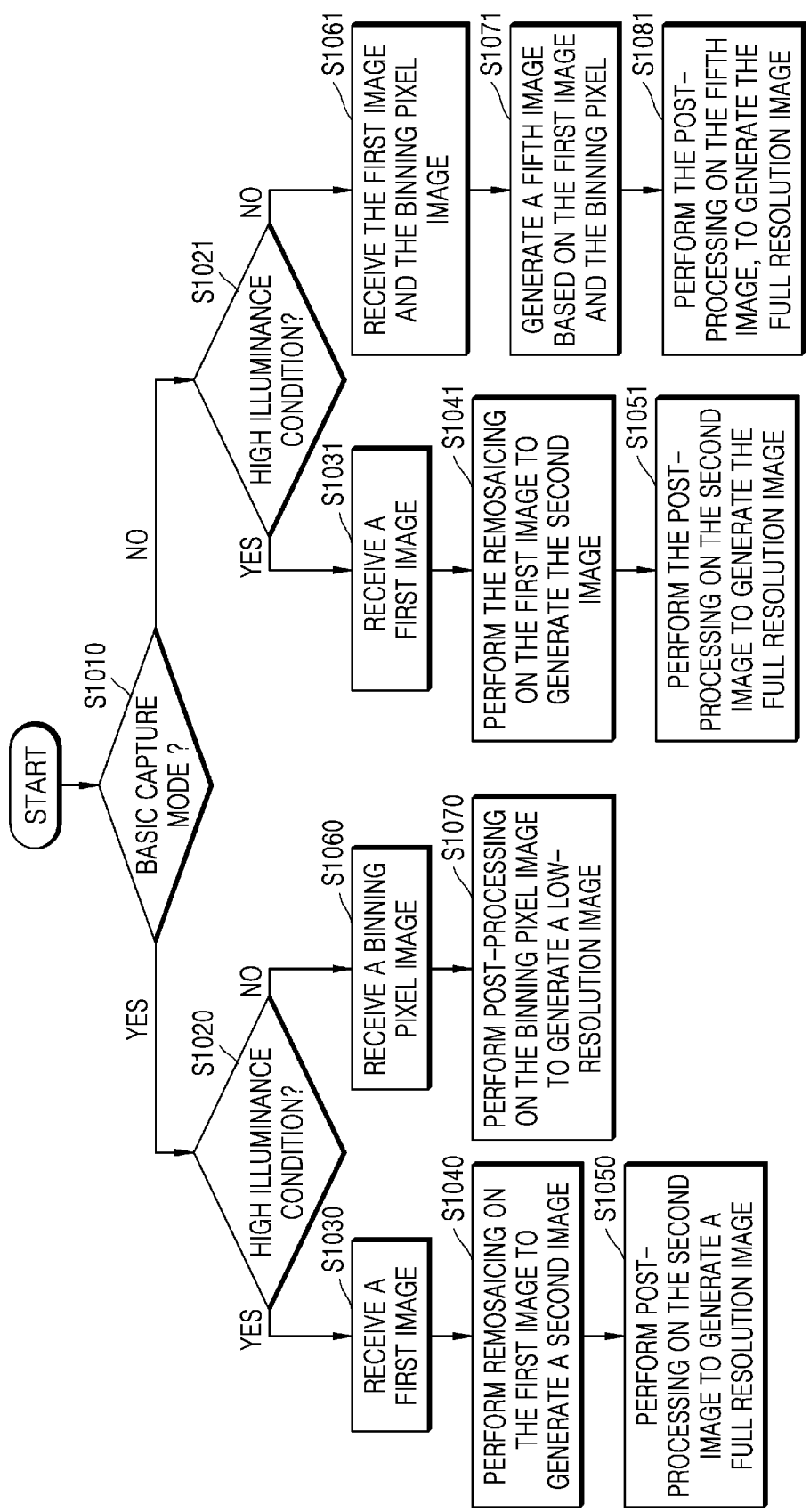
FIG. 10 shows a flowchart of an image processing method according to an embodiment.

FIG. 10 shows a flowchart of an image processing method according to an embodiment.

In operation S1010, whether the electronic device captures in a basic capture mode or in a special capture mode is determined.

When the electronic device captures in the basic capture mode, in operation S1020, the mode selector determines the illuminance condition of environment in which the CMOS sensor 110 captures images.

When the determined illuminance condition is the high illuminance condition, in operation S1030, the pre-processor 121 receives a raw image of the CMOS sensor 110 as the first image.

In operation S1040, the pre-processor 121 performs remosaicing on the first image to generate a second image in Bayer format. Here, the process of performing the remosaicing on the first image may be similar to those described in FIG. 3 to FIG. 5B or FIG. 8, and therefore, repeated description will be omitted to avoid redundancy.

In operation S1050, the main processor 122 performs post-processing on the second image to generate a full resolution image.

When the determined illuminance condition is the low illuminance condition, in operation S1060, the main processor 122 receives a binning pixel image.

In operation S1070, the main processor 122 performs post-processing on the binning pixel image to generate a low-resolution image, a resolution of the low-resolution image being smaller than a resolution of the full resolution image. For example, the resolution of the low-resolution image is 1/N of the resolution of the full resolution image. When the CMOS sensor 110 is a Tetra CMOS sensor, the resolution of the low-resolution image is ¼ of the resolution of the full resolution image. When the CMOS sensor 110 is a Nona CMOS sensor, the resolution of the low-resolution image is ⅑ of the resolution of the full resolution image.

When the electronic device captures in the special capture mode, in operation 51021, the mode selector determines the illuminance condition of the environment in which the CMOS sensor 110 captures the images.

When the determined illuminance condition is the high illuminance condition, in operation S1031, the pre-processor 121 receives the raw image of the CMOS sensor 110 as the first image.

In operation S1041, the pre-processor 121 performs the remosaicing on the first image to generate the second image in Bayer format. Here, the process of performing the remosaicing on the first image may be similar to those described in FIG. 3 to FIG. 5B or FIG. 8, and therefore, repeated description will be omitted to avoid redundancy.

In operation S1051, the main processor 122 performs the post-processing on the second image to generate the full resolution image.

When the determined illuminance condition is the low illuminance condition, in operation S1061, the pre-processor 121 receives the first image and the binning pixel image, or only receives the first image and converts the first image into the binning pixel image.

In operation S1071, a fifth image is generated based on the first image and the binning pixel image using the pre-processor 121. Here, the process of generating the fifth image by the pre-processor 121 may include operations S320 to S350 of FIG. 3 or operations S810 and S820 of FIG. 8 and operations S630 to S670 of FIG. 6, and therefore, repeated descriptions will be omitted to avoid redundancy.

In operation S1081, the post-processing is performed on the fifth image using the main processor 122, to generate the full resolution image.

Figure 11:
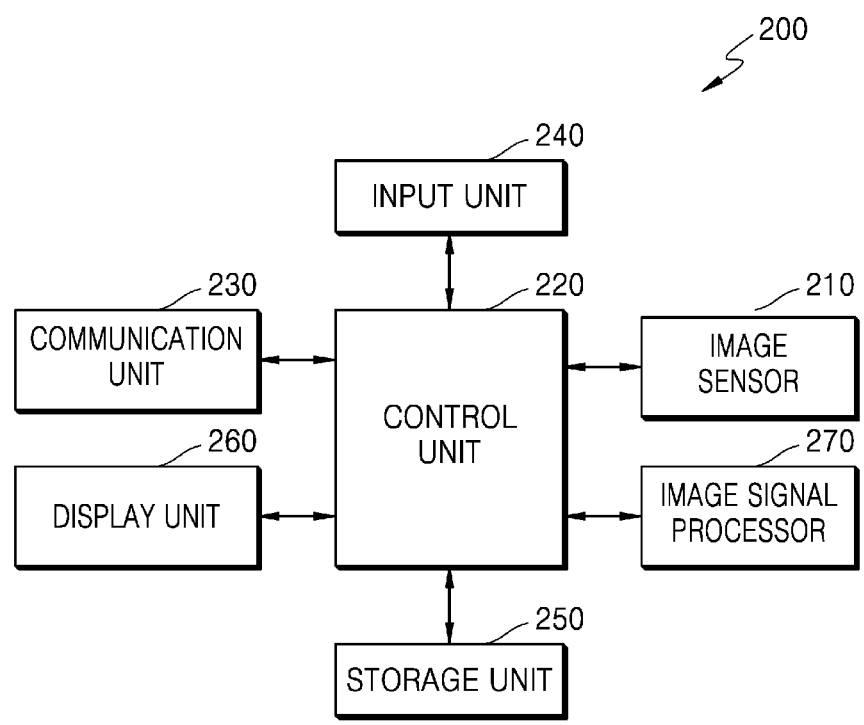
FIG. 11 shows a block diagram of a mobile terminal according to an embodiment.

FIG. 11 shows a block diagram of an electronic device, e.g., a mobile terminal, according to one or more embodiments.

As shown in FIG. 11, the mobile terminal 200 in one or more embodiments includes an image sensor 210, a control unit 220, a communication unit 230, an input unit 240, a storage unit 250, a display unit 260, and an image signal processor 270. For example, the mobile terminal 200 may correspond to the electronic device 100 of FIG. 1, the image sensor 210 may correspond to the CMOS sensor 110, and the control unit 220 may be a part of the AP 120 or a separate processor.

The image sensor 210 is connected to the control unit 220. The image sensor 210 is used to capture images. The image signal processor 270 and/or the control unit 220 may process the images output by the image sensor 210 (for example, using the image processing method shown in FIG. 3 or 10). The control unit 220 may display the processed images on the display unit 260 or store them in the storage unit 250.

The communication unit 230 may perform a communication operation of the mobile terminal. The communication unit 230 may establish a communication channel to the communication network and/or may perform communication associated with, for example, image processing.

The input unit 240 is configured to receive various input information and various control signals, and transmit the input information and control signals to the control unit 220. The input unit 240 may be realized by various input devices such as touch screens, etc.

The storage unit 250 may include volatile memory and/or nonvolatile memory. The storage unit 250 may store various data generated and used by the mobile terminal. For example, the storage unit 250 may store an operating system (OS) and applications (e.g., applications associated with the method of embodiments) for controlling the operation of the mobile terminal. The control unit 220 may control the overall operation of the mobile terminal and may control part or all of the internal elements of the mobile terminal. The control unit 220 may be implemented as general-purpose processor, application processor (AP), application specific integrated circuit, field programmable gate array, etc., but an embodiment is not limited thereto.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller.

One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card or a micro card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents.

What is claimed is:

1. An image processing method comprising:
   receiving a raw image of an image sensor as a first image;
   performing remosaicing on the first image to generate a second image in a Bayer format, the performing the remosaicing comprising:
      converting the first image into a first color image,
      performing false color correction on the first color image,
      re-correcting an over-correction caused in performing the false color correction to generate a second color image, and
      converting the second color image into the second image in the Bayer format; and
   generating a full resolution image as an output image based on the second image,
   wherein the performing the false color correction on the first color image further includes generating a third color image by performing blur processing on the first color image, and
   wherein the re-correcting the over-correction caused in the performing the false color correction further includes:
      adjusting a high frequency part of the first color image, and
      generating the second color image based on the adjusted high frequency part of the first color image and the third color image.

2. The image processing method of claim 1, wherein the generating the full resolution image based on the second image further includes:
   based on an illuminance condition of an environment in which the image sensor captures the first image being a first illuminance condition, generating the full resolution image by performing post-processing on the second image,
   wherein the first illuminance condition represents that an illuminance of the environment in which the image sensor captures the first image is greater than a threshold.

3. The image processing method of claim 1, wherein the generating the full resolution image based on the second image further includes:
   based on an illuminance condition of an environment in which the image sensor captures the first image being a second illuminance condition, extracting high-frequency details from the second image, to generate a third image in the Bayer format that contains the extracted high-frequency details,
   performing upscaling on a binning pixel image to generate a fourth image in the Bayer format, a resolution of the fourth image being the same as that of the third image,
   generating a fifth image in the Bayer format by combining pixel values of pixels at corresponding positions of the third image and the fourth image, and
   generating the full resolution image by performing post-processing on the fifth image,
   wherein the second illuminance condition represents that an illuminance of the environment in which the image sensor captures the first image is less than or equal to a threshold, and
   wherein the binning pixel image represents a multi pixels-in-one image corresponding to the first image.

4. The image processing method of claim 1, wherein the high frequency part of the first color image is obtained based on the first color image and the third color image;
   wherein the high frequency part of the first color image is obtained by, for each pixel of the first color image, subtracting a red component, a green component, and a blue component of a corresponding pixel in the third color image from a red component, a green component, and a blue component of each pixel in the first color image, respectively;
   wherein the adjusting the high frequency part of the first color image further includes generating the adjusted high frequency part of the first color image by multiplying a red component, a green component, and a blue component of each pixel in the high frequency part of the first color image by a debugging value; and
   wherein the generating the second color image based on the adjusted high frequency part of the first color image and the third color image further includes, for each pixel in the adjusted high frequency part of the first color image, adding a red component, a green component, and a blue component of each pixel in the adjusted high frequency part of the first color image to a red component, a green component, and a blue component of a corresponding pixel in the third color image, to generate the second color image.

5. The image processing method of claim 1, wherein the converting the second color image into the second image further includes:
   determining an arrangement of color channels of the second image and a color channel of each pixel of the second image according to an arrangement of color channels of the first image;
   for each pixel having a green channel in the second image, determining a pixel value of the pixel of the second image based on a green component of a corresponding pixel of the second color image;
   for each pixel not having the green channel in the second image, determining whether a color channel of the pixel of the second image is the same as a color channel of a corresponding pixel of the first image;
   based on the color channel of the pixel of the second image being the same as the color channel of the corresponding pixel of the first image, determining a pixel value of the pixel of the second image based on a first color component of the corresponding pixel of the second color image; and
   based on the color channel of the pixel of the second image being different from the color channel of the corresponding pixel of the first image, determining a pixel value of the pixel of the second image based on a red component, a green component, a blue component of the corresponding pixel of the second color image,
   wherein a color channel corresponding to the first color component is the same as the color channel of the pixel of the second image.

6. An image processing method comprising:
   receiving a raw image of an image sensor as a first image;
   performing remosaicing on the first image to generate a second image in a Bayer format, the performing the remosaicing comprising:
      converting the first image into a first color image,
      performing false color correction on the first color image, re-correcting an over-correction caused in performing the false color correction to generate a second color image, and converting the second color image into the second image in the Bayer format; and generating a full resolution image as an output image based on the second image, wherein the generating the full resolution image based on the second image further includes, based on an illuminance condition of an environment in which the image sensor captures the first image being a first illuminance condition, generating the full resolution image as the output image by performing post-processing on the second image, wherein the image processing method further comprises, based on the illuminance condition of the environment in which the image sensor captures the first image being a second illuminance condition, generating the output image by performing the post-processing on a binning pixel image, wherein the first illuminance condition represents that an illuminance of the environment in which the image sensor captures the first image is greater than a threshold, wherein the second illuminance condition represents that the illuminance of the environment in which the image sensor captures the first image is less than or equal to the threshold, and wherein the binning pixel image represents a multi pixels-in-one image corresponding to the first image.

7. An image processing method comprising:

receiving a raw image of an image sensor as a first image;

performing remosaicing on the first image to generate a second image in a Bayer format, the performing the remosaicing comprising:

converting the first image into a first color image, performing false color correction on the first color image, re-correcting an over-correction caused in performing the false color correction to generate a second color image, and converting the second color image into the second image in the Bayer format; and generating a full resolution image as an output image based on the second image, wherein the converting the first image into the first color image further includes:

determining an interpolation direction of a green component of each pixel of the first color image, and generating the first color image by performing direction interpolation on the first image based on the interpolation direction.

8. The image processing method of claim 7, wherein the generating the first color image by performing the direction interpolation on the first image based on the interpolation direction further includes:

selecting a filter based on a color channel of each pixel of the first image, a block centered on each pixel of the first image, and an interpolation direction of a green component of a corresponding pixel of the first color image, determining a green component of the corresponding pixel of the first color image based on the filter and the block centered on each pixel of the first image, and determining a red component and a blue component of the corresponding pixel of the first color image based on the color channel of each pixel of the first image.

9. The image processing method of claim 1, wherein the image sensor is a multi pixels-in-one CMOS sensor.

10. The image processing method of claim 2, wherein the post-processing further includes:

converting the second image in the Bayer format into an image in an RGB format, and converting the image in the RGB format into an image in a YUV format.

11. An electronic device comprising:

an image signal processor configured to perform the method of claim 1; and the image sensor configured to generate the raw image as the first image.

12. A non-transitory computer-readable storage medium storing instructions that, when executed by a processor, cause the processor to execute the method of claim 1.

* * * * *